Sept. 29, 1925.
E. G. PARVIN
MOTOR REVERSING MEANS
Filed Oct. 21, 1924
1,555,020
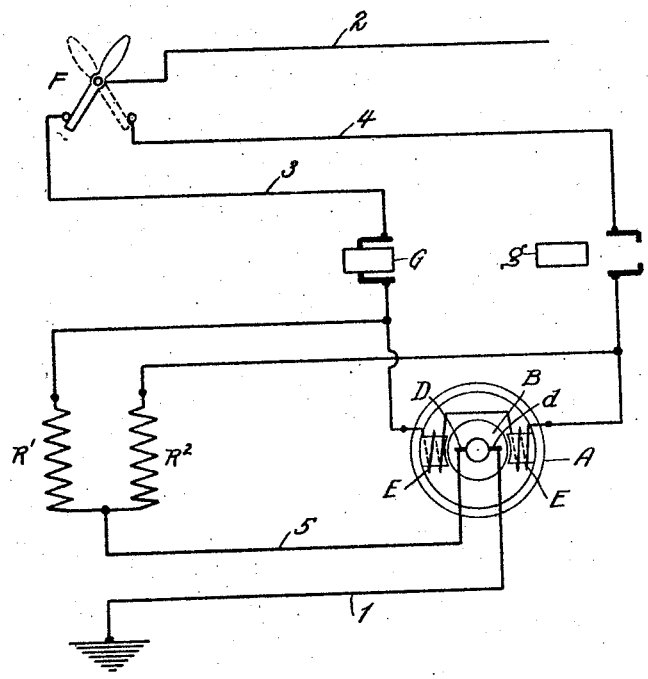
INVENTOR
Edward G Parvin
BY
John E. Hubbell
ATTORNEY Patented Sept. 29, 1925.

1,555,020

UNITED STATES PATENT OFFICE.

EDWARD G. PARVIN, OF ROSELLE, NEW JERSEY, ASSIGNOR TO ZOBELL ELECTRIC MOTOR CORPORATION, OF GARWOOD, NEW JERSEY, A CORPORATION OF NEW YORK.

MOTOR-REVERSING MEANS.

Application filed October 21, 1924. Serial No. 745,004.

*To all whom it may concern:*

Be it known that I, EDWARD G. PARVIN, a citizen of the United States, and resident of Roselle, in the county of Union and State of New Jersey, have invented certain new and useful Improvements in Motor-Reversing Means, of which the following is a specification.

The general object of my present invention is to provide improved means for causing an electric motor to rotate in either direction as desired. More specifically, the object of my invention is to provide simple and effective provisions for energizing a reversing commutating motor from a source of potential difference great enough to make it advantageous or at least not seriously objectionable to employ resistance of appreciable magnitude in series with the armature winding of the motor.

The various features of novelty which characterize my invention are pointed out with particularity in the claims annexed to and forming a part of this specification; but for a better understanding of the invention, its advantages and specific objects attained with its use reference should be had to the accompanying drawings and descriptive matter in which I have diagrammatically illustrated and described a preferred embodiment of my invention.

The one figure of the drawing is a diagram illustrating suitable connections for energizing a car door operating motor from the power or trolley circuit of an electric railway.

In the drawing A represents the field magnet, B the armature, D and d the brushes of opposing polarity, and E the field coils of an ordinary direct current motor. The brush d is connected to one side of the power circuit, as shown, by a ground connection 1, while the other brush D may be connected to the other side of the power circuit shown as a trolley wire or other conductor 2 in either of two ways depending on the setting of a switch F. With the setting of the switch F shown in full lines in the drawing, the brush D is connected to the conductor 2 through a conductor 5, resistance R', a shunt about the resistance R' which includes a resistance $R^2$ and the motor field coils E, and a conductor 3. By throwing the switch F into the dotted line position shown in the drawing, the brush D may be connected to the conductor 2 through conductor 5, the resistance $R^2$, a shunt about the resistance $R^2$ which includes the resistance R' and motor field coils E, and a conductor 4.

With the described arrangement the adjustment of the switch F from one to the other of its two operative positions does not change the direction of current flow through the armature winding of the motor, but does change the direction of current flow through the field coils E. In consequence, if the motor will turn in the clockwise direction, for example, with the switch F in its full line position, it will turn in the counter clockwise direction with the switch F in its dotted line position. Furthermore, if the resistances R' and $R^2$ are of equal magnitude, the strength of the energizing currents through the field winding and armature of the motor will be the same for similar load conditions in either setting of the switch F.

The described arrangement is well adapted for such a purpose as that for which it was primarily designed, namely, for opening and closing the car doors of electric railway trains, because of its simplicity and reliability, and because in such a use the voltage impressed on the armature winding is advantageously but a fraction of the voltage of the power circuit, so that resistance in series with the armature winding is necessary or desirable in any event.

In operating car doors and for other purposes for which the invention may be employed with special advantage, limit switches G and $g$ which may be of any usual or suitable type are advantageously provided each to be actuated by the motor to open the motor energizing circuit of which it forms a part when the motor movement in the corresponding direction has reached a predetermined limit. With the described arrangement in which the switches G and $g$ are located in the conductors 3 and 4, respectively, the circuit including the field coils E and resistances R' and $R^2$ in series with one another, tends to reduce sparking at either of the limit switches G and $g$ when it is opened to arrest the movement of the motor. While I have illustrated the use of my invention in connection with a two pole, two brush motor it will be apparent that the invention is in no wise restricted or dependent upon such characteristics of the motor employed. Generic features of invention embodied alike in the apparatus specifically disclosed in this application, and in an alternative form of apparatus disclosed in my co-pending application, Serial No. 19,573, filed March 31, 1925, are claimed in the last mentioned application.

Having now described my invention what I claim as new and desire to secure by Letters Patent, is:

1. The combination with the commutator brushes and field winding of a commutator motor, of a resistance connecting one of said brushes to one terminal of the field winding, a second resistance connecting the same brush to the other terminal of the field winding, and means for connecting the other brush to one side of an energizing source of current and for optionally connecting one or the other of the terminals of the field winding to the other side of said source.

2. The combination with the brushes and field winding of a commutator motor, of means for energizing the motor for rotation in either direction comprising a pair of conductors connected to the opposite terminals of said field winding, a pair of resistances connected between said conductors in series with one another and in multiple with said field winding, a connection from one brush of the motor to the connection between said resistances, means for connecting the other brush of the motor to one side of an energizing source of current and for optionally connecting one or the other of said conductors to the other side of said source, and a limit switch in each of said conductors and each adapted on a predetermined movement of the motor to open the corresponding conductor at a point between its connection to the source of current and its connection to the corresponding resistance and field winding terminal.

Signed at Garwood, in the county of Union, and State of New Jersey, this 15th day of October, A. D. 1924.

EDWARD G. PARVIN.